Aug. 26, 1947.                G. E. DATH                2,426,261
                        FRICTION SHOCK ABSORBER
                          Filed April 8, 1944
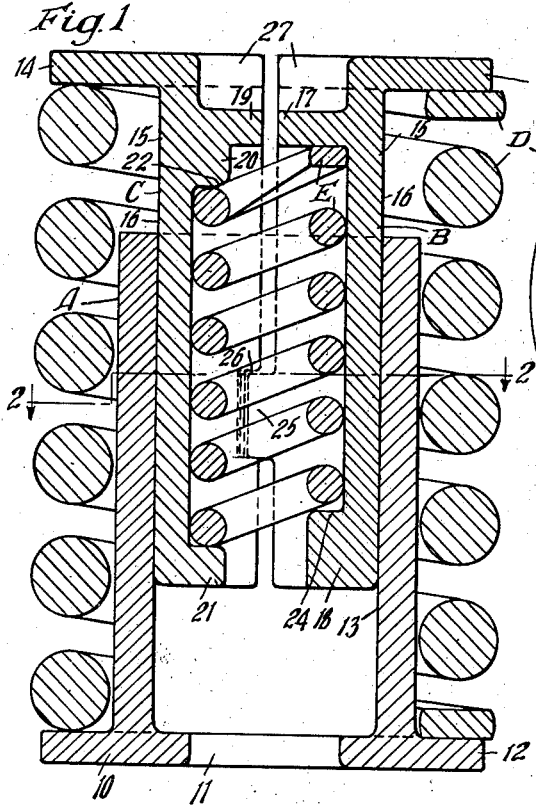
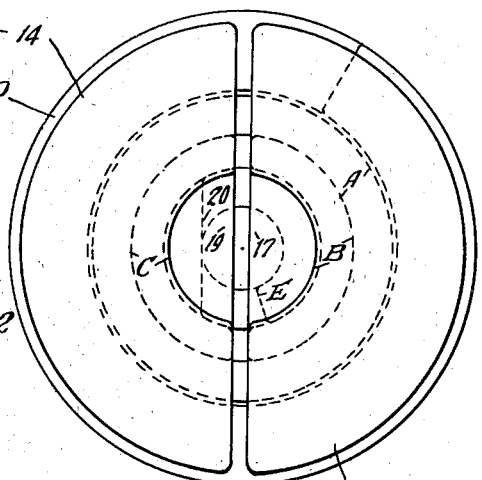
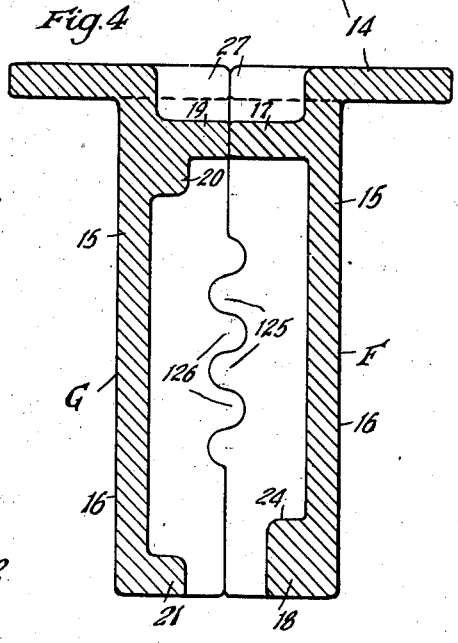
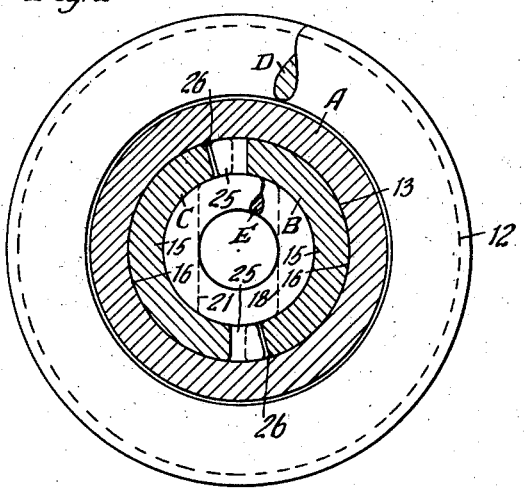
Inventor
George E. Dath
By Henry Fuchs
                Atty.

Patented Aug. 26, 1947

2,426,261

UNITED STATES PATENT OFFICE 2,426,261

FRICTION SHOCK ABSORBER

George E. Dath, Chicago, Ill., assignor to W. H. Miner, Inc., Chicago, Ill., a corporation of Delaware Application April 8, 1944, Serial No. 530,113

7 Claims. (Cl. 267—9)

This invention relates to improvements in friction shock absorbers, especially adapted for snubbing the action of truck springs of railway cars.

One object of the invention is to provide a friction shock absorber of the character indicated, comprising a friction casing and a friction clutch slidably telescoped within the casing, wherein the friction clutch includes a plurality of friction shoes and spring means for pressing the shoes against the interior walls of the casing to provide frictional resistance against relative lengthwise movement of the shoes and casing, and wherein the spring means is in the form of a lengthwise distorted helical coil, which due to its tendency to assume its original shape forces the shoes apart to press the same against the casing walls.

A more specific object of the invention is to provide a mechanism as set forth in the preceding paragraph, wherein the distorted helical spring is embraced by the shoes and in its distorted state is diametrically contracted and has the coil portions at diametrically opposed sides thereof displaced in opposite directions lengthwise of the spring, whereby its tendency to return to its undistorted state and normal diameter forces the shoes apart to expand the clutch against the interior walls of the casing.

Other objects of the invention will more clearly appear from the description and claims hereinafter following.

In the drawing forming a part of this specification, Figure 1 is a central, longitudinal vertical sectional view of the improved shock absorber or snubber embodied in my invention. Figure 2 is a horizontal sectional view, corresponding substantially to the line 2—2 of Figure 1. Figure 3 is a top plan view of Figure 1. Figure 4 is a central, longitudinal sectional view through the friction shoes of the improved shock absorber, illustrating a modification of the shoe structure.

Referring first to the embodiment of the invention illustrated in Figures 1, 2, and 3, my improved shock absorber comprises broadly a friction casing A; a pair of friction shoes B and C telescoped within the casing; a relatively heavy outer coil spring D surrounding the casing and shoes; and a helical inner coil spring E embraced by the shoes and maintaining the shoes yieldingly spread apart to hold the same in frictional contact with the interior of the casing.

The friction casing A is in the form of a cylindrical, tubular member, open at the top end and closed at the bottom end by a transverse wall 10. The wall 10 has a central opening 11 therethrough to accommodate the usual centering projection of the lower spring follower plate of the truck spring cluster. The bottom wall 10 of the casing A extends laterally outwardly beyond the casing side wall, forming an annular follower flange 12. The cylindrical casing A presents a longitudinally extending, transversely curved, or cylindrical friction surface 13.

The friction shoes B and C are of similar design, except as hereinafter pointed out. Each shoe comprises an elongated, relatively heavy, transversely curved body portion having a laterally outstanding, horizontal flange 14 at its upper end. The body portion of the shoe, which is indicated by 15, presents an exterior, longitudinally extending, transversely curved friction surface 16, adapted to engage the interior surface 13 of the casing A. At the upper end, the shoe B is provided with a horizontally extending, inner web 17, which is offset inwardly slightly from the upper end of said shoe, as clearly shown in Figure 1. At the lower end, the shoe B has an inwardly projecting, relatively heavy, horizontal flange 18, which terminates short of the inner side of the shoe.

As clearly shown in Figure 1, the shoes B and C are disposed respectively at the right and left hand sides of the mechanism and have their upper and lower ends in horizontal alignment with each other. The shoe C has an inwardly extending web 19 at the upper end thereof, which has the upper surface in horizontal alignment with the web or flange 17 of the shoe B. At the lower end, the shoe C has an inturned, horizontal flange 21 opposed to the flange 18 of the shoe B, the flange 21 being of lesser thickness than the flange 18 and terminating short of the inner side of said shoe C. The inner side of the offset 20 of the web or flange 19 of the shoe C presents a downwardly facing, interior abutment shoulder 22, which, as shown in Figure 1, is downwardly offset with respect to the lower surface of the web or flange 17 of the shoe B. The flange 18 at the bottom end of the shoe B presents an upwardly facing abutment shoulder 24, which, as shown in Figure 1, is upwardly offset with respect to the upper surface of the flange 21 at the lower end of the shoe C.

The friction shoes B and C are interlocked against lengthwise displacement by an interengaging tongue 25 on the shoe B and slot 26 on the shoe C. As shown in Figure 1, clearance is provided between the inner sides of the shoes B and C and the inner end of the tongue 25 and the end wall of the slot 26 to permit a certain amount of contraction of the clutch formed by the shoes. The inwardly offset flanges or webs 17 and 19 of the shoes B and C provide recesses 27—27 which together form a seat for the centering projection of the upper spring follower plate of the truck spring cluster.

The outer spring D is in the form of a relatively heavy helical coil which surrounds the casing A and the friction shoes B and C and has its top and bottom ends bearing respectively on the flanges 14—14 at the upper ends of the shoes B and C and the flange 12 at the lower end of the casing A. The spring D is preferably under initial compression when the device is assembled with the body bolster and side frame of a car and yieldingly resists relative approach lengthwise of the casing and shoes.

The spring E, which is in the form of a helical coil, is disposed between the shoes B and C and has its upper end bearing on the web 17 of the shoe B and the shoulder 22 of the shoe C, and its lower end bearing on the shoulder 24 of the shoe B and the upper side of the flange 21 of the shoe C. As will be evident, due to the offset relation of the upper surface of the flange 21 and the shoulder 24 at the lower ends of the shoes and the offset relation of the shoulder 22 and the flange 17 at the upper ends of the shoes, the spring E is lengthwise distorted so that the portions of the coils at one diametrical side of the spring are flexed upwardly with respect to the coil portions on the other diametrical side thereof. The distorted spring closely fits the shoes with the outer sides of the coils thereof bearing against the vertical inner sides of the shoes. To assure this bearing engagement with the shoes, the spring employed is of a size that the overall diameter thereof before application between the shoes is somewhat greater than the overall diameter in its distorted state. The tendency of the distorted spring E to return to its initial shape and diameter presses the shoes apart into tight frictional contact with the casing A.

As will be evident, the shoes B and C together with the spring E form an expandible clutch which slidably engages the interior friction surface 13 of the casing. The spring E being under constant distortion, the shoes are pressed into frictional engagement with the interior wall of the casing under a pressure which is substantially uniform throughout the action of the device, thus affording constant uniform frictional resistance to relative longitudinal movement of the casing A and shoes B and C.

In assembling the mechanism, the spring D is first placed over the casing A with the lower end thereof resting on the follower flange 12 of the casing. The shoes B and C, with the spring E therebetween, are telescoped within the casing A. In assembling the shoes B and C with the spring E before telescoping the same within the casing, the spring is placed between the shoes, the shoulder 22 of the shoe C being disposed in horizontal alignment with the bottom surface of the flange or web 17 of the shoe B and the shoulder 24 of the shoe B being disposed in horizontal alignment with the upper surface of the flange 21 of the shoe C. The shoes B and C are then displaced lengthwise with respect to each other until the upper and lower ends thereof come into alignment, thereby distorting the spring E. With the spring thus distorted, the shoes are pressed together so as to engage the tongue 25 in the slot 26 to lock the shoes together against lengthwise separation. With the shoes in the contracted condition described, the same are telescoped within the open upper end of the casing A.

As will be understood, my improved shock absorber when used as a snubber in connection with truck springs of railway cars takes the place of at least one of the usual spring units of each spring cluster of truck springs and is interposed between the truck bolster and the spring plank of the truck in the same manner as the spring units. The number of snubbers employed in a spring cluster may be varied to suit conditions, it being evident that, when found desirable, two or more of such devices may be used in each spring cluster. Also a complete cluster of such snubbers may be substituted for the entire spring cluster of the truck.

In the operation of my improved shock absorber or snubber, upon the springs of the spring cluster of the truck of a railway car being compressed by relative approach of the truck bolster and spring plank, the snubbing unit will also be compressed between these members and the friction shoes B and C forced inwardly of the casing A opposed by the spring D. Due to the friction existing between the friction shoes and the interior friction surfaces of the casing A, relative movement of these parts is frictionally opposed and the action of the springs of the cluster effectively snubbed. When the spring follower plates of the spring cluster are separated by recoil action of the truck springs, the friction shoes B and C and the casing A will also be forced apart and returned to normal position by the expansive action of the spring D.

Referring next to the embodiment of the invention illustrated in Figure 4, which shows modified friction shoes, the shoes, which are indicated by F and G, are identical with the shoes B and C hereinbefore described in connection with Figures 1, 2, and 3, with the exception that a series of interengaging grooves and tongues are provided, instead of only one set, as shown in Figures 1, 2, and 3. The parts of the shoes F and G, which are identical with the corresponding parts of the shoes B and C, are indicated by the same reference characters as employed in Figures 1, 2, and 3. Each shoe F and G is provided with alternate projections 125 and recesses 126 which are interengaged to interlock the shoes against lengthwise movement. As shown in Figure 4, the projections 125 are rounded off and the recesses 126 have the inner walls rounded, thereby facilitating interengagement of these parts in assembling the spring with the shoes.

I claim:

1. In a friction shock absorber, the combination with a friction casing; of a pair of friction shoes telescoped within the casing and having sliding contact with the interior wall thereof; a lengthwise extending helical spring tightly embraced by said shoes and having diametrically opposite sides thereof stressed respectively in reverse directions lengthwise of the spring, said shoes having interior, transverse abutment shoulders at the opposite ends thereof, the shoulders of one shoe being offset in the same direction with respect to the shoulders of the other shoe, said shoulders bearing on the opposite ends of the spring; interengaging locking means on said shoes for holding the same against relative displacement in lengthwise direction and thereby maintain said spring in said stressed condition; and spring means yieldingly opposing relative longitudinal movement of the casing and shoes toward each other.

2. In a friction shock absorber, the combination with a friction casing; of a pair of friction shoes telescoped within the casing in sliding frictional engagement with the interior wall of said casing, each of said shoes having interior, transverse spring abutment shoulders at opposite ends thereof, and a longitudinally extending, transversely curved, interior surface between the shoulders of each shoe, said surface being continuous from one shoulder to the other and substantially straight lengthwise, the shoulders at corresponding ends of said shoes being offset with respect to each other in a direction lengthwise of the mechanism, the offset of said shoulders at opposite ends of the shoes being respectively in the same direction; a longitudinally extending helical coil spring embraced between said shoes having one end bearing on the offset shoulders at one set of ends of said shoes, and the other end bearing on the offset shoulders at the opposite set of ends of said shoes, said spring being under lateral compression between said interior surfaces of the shoes and held in distorted condition between said shoulders and surfaces with diametrically opposite sides thereof stressed respectively in reverse directions lengthwise of the same; and a spring surrounding said casing and shoes and opposing relative lengthwise movement thereof toward each other.

3. In a friction shock absorber, the combination with a friction casing; of a pair of friction shoes telescoped within the casing in sliding frictional engagement with the interior wall of said casing, each shoe having interior, transverse spring abutment shoulders at the inner and outer ends thereof respectively and a longitudinally extending, interior surface continuous between said shoulders, said surface being straight in lengthwise direction, said inner shoulders of said two shoes being offset inwardly with respect to each other, and said outer shoulders of said two shoes being offset with respect to each other in the same direction as said first named shoulders; a lengthwise extending, helical coil spring in distorted condition with diametrically opposite sides stressed respectively in reverse directions lengthwise of said spring, said spring in said distorted condition being embraced tightly by said shoes and under lateral compression between said interior surfaces of the shoes, and bearing at the inner end on the offset shoulders of both of said shoes at the inner ends thereof, and bearing at the outer end on the offset shoulders at the outer ends of both of said shoes and being under lateral compression between said shoes; and a spring opposing relative lengthwise movement of the casing and shoes toward each other.

4. In a friction shock absorber, the combination with a friction casing; of a pair of friction shoes telescoped within the casing and having sliding contact with the interior wall thereof, said shoes having longitudinally extending, transversely curved surfaces on the inner sides thereof, said curved surfaces being straight in lengthwise direction; a lengthwise extending helical spring embraced by said shoes between said transversely curved inner surfaces, and said spring being under lateral compression between said surfaces, said shoes having interior, transverse abutment shoulders at the opposite ends of the interior surfaces thereof, the shoulders of one shoe being offset in the same direction with respect to the shoulders of the other shoe, said shoulders bearing on the opposite ends of the spring and holding the spring distorted with diametrically opposite sides thereof stressed respectively in reverse directions lengthwise of the spring; interengaging means on said shoes for holding the same against relative lengthwise displacement; and spring means yieldingly opposing relative longitudinal movement of the casing and shoes toward each other.

5. In a friction shock absorber, the combination with a friction casing; of a pair of friction shoes telescoped within the casing in sliding frictional engagement with the interior wall of said casing; a longitudinally extending, helical coil spring for holding said shoes spread apart in tight frictional engagement with said interior wall of the casing, said spring being in distorted condition with diametrically opposite sides thereof stressed respectively in reverse directions lengthwise of the same, each of said shoes having interior, transverse spring abutment shoulders at opposite ends thereof and a longitudinally extending, transversely curved, interior spring abutment surface between said shoulders of each shoe, said surface being continuous between said shoulders and substantially straight in lengthwise direction, the shoulders at corresponding ends of said shoes being offset with respect to each other in a direction lengthwise of the mechanism, the offset of said shoulders at opposite ends of said shoes being respectively in the same direction, said helical coil spring being embraced by and under lateral compression between said shoes and having one end bearing on the offset shoulders at one set of ends of said shoes, and the other end bearing on the offset shoulders at the opposite set of ends of said shoes, said interior surfaces and shoulders of the shoes confining said spring in said distorted condition; interengaging means of tongue and groove formation, on said shoes respectively, for holding said shoes against relative lengthwise displacement; and a spring surrounding said casing and shoes and opposing relative lengthwise movement thereof toward each other.

6. In a friction shock absorber, the combination with a friction casing; of a pair of friction shoes telescoped within the casing in sliding frictional engagement with the interior wall of said casing; a longitudinally extending, helical coil spring for holding said shoes spread apart in tight frictional engagement with said interior wall of the casing, said spring being in distorted condition with diametrically opposite sides thereof stressed respectively in reverse directions lengthwise of the same, each shoe having interior, transverse spring abutment shoulders at the inner and outer ends thereof respectively, said inner shoulders of said two shoes being offset inwardly with respect to each other, and said outer shoulders of said two shoes being offset with respect to each other in the same direction as said first named shoulders, said helical coil spring being embraced tightly by said shoes in diametrically contracted condition and bearing at the inner end on the offset shoulders of both of said shoes at the inner ends thereof, and bearing at the outer end on the offset shoulders at the outer ends of said shoes, said shoulders of said shoes holding said spring in said distorted condition; interengaging means for holding said shoes against relative displacement with respect to each other in lengthwise direction, said means comprising interengaging rounded projections and curved seats on said shoes; and a spring opposing relative lengthwise movement of the casing and shoes toward each other.

7. In a friction shock absorber, the combination with a tubular friction casing having diametrically opposed, lengthwise extending, interior friction surfaces; of opposed friction shoes slidingly telescoped within the casing for movement lengthwise thereof, said shoes having outer friction surfaces in sliding engagement with the friction surfaces of the casing, each of said shoes having a lengthwise extending, smooth, abutment surface on the inner side thereof, said abutment surfaces of said shoes being opposed to each other in laterally spaced relation; and a helical coil spring extending lengthwise between said shoes, said helical coil spring having diametrically opposite sides thereof bearing on the abutment surfaces of said shoes, respectively, at diametrically opposite sides of the mechanism, the diametrical distance between said abutment surfaces at said diametrically opposite sides of the mechanism being less than the diameter of said helical coil spring in the normal undistorted condition thereof, whereby said spring is held between said shoes in distorted condition with said diametrically opposite sides thereof stressed, respectively, in reverse directions lengthwise of the same to yieldingly press said shoes against the friction surfaces of the casing.

GEORGE E. DATH.

REFERENCES CITED

The following references are of record in the file of this patent:

UNITED STATES PATENTS

| Number | Name | Date |
|---|---|---|
| 736,071 | Christianson | Aug. 11, 1903 |
| 2,182,917 | Dentler | Dec. 12, 1939 |
| 1,953,219 | Fuchs | Apr. 3, 1934 |
| 2,198,261 | Barrows et al. | Apr. 23, 1940 |
| 2,216,231 | Dentler | Oct. 1, 1940 |